Patented Dec. 14, 1943

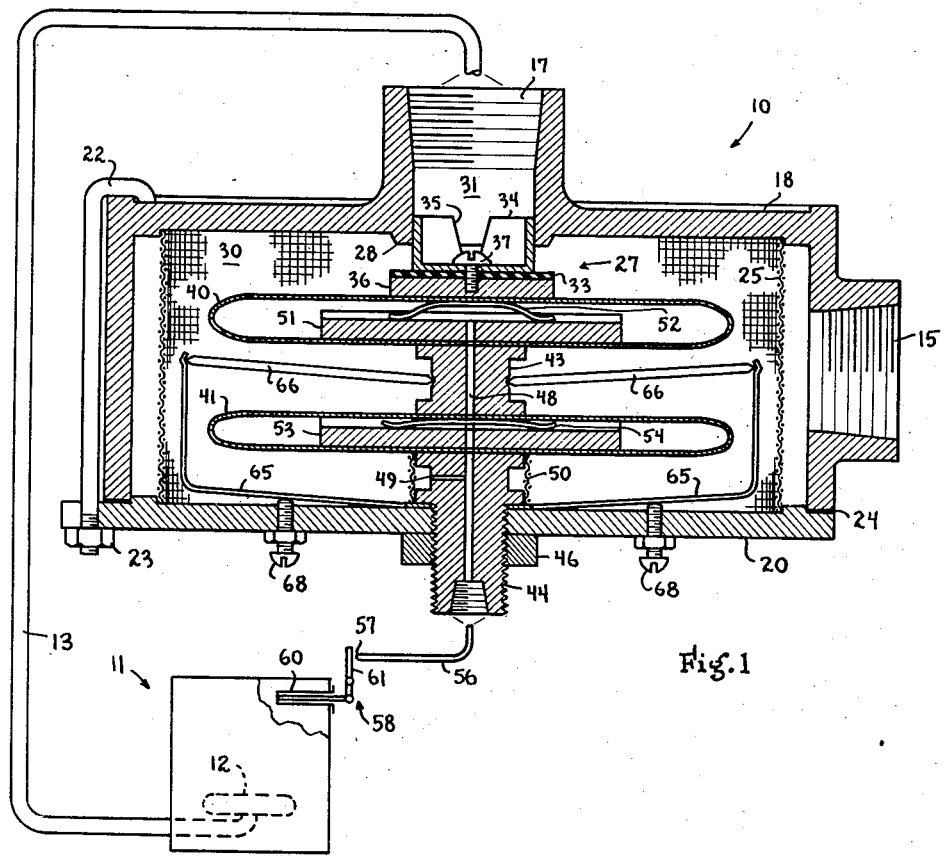

2,336,647

UNITED STATES PATENT OFFICE 2,336,647

VALVE

Charles B. Spangenberg, Philadelphia, Pa., assignor to Minneapolis-Honeywell Regulator Company, Minneapolis, Minn., a corporation of Delaware Application January 10, 1942, Serial No. 426,347

11 Claims. (Cl. 137—139)

This invention is directed to valves and particularly to valves for the control of a combustible fluid being supplied to a burner.

It is often desirable in the automatic operation of a fluid fired heater to supply just the proper amount of fuel to the burner to satisfy the demand for heat on the burner. In this case the valve which controls the supply of fuel must be of the modulating type as distinguished from the two position type. While the fuel supply to the conventional burner may be modulated successfully through a considerable range, there is a lower limit to the rate of fuel supply at which the burner will operate satisfactorily. Hence, a modulating control valve must be positioned rapidly between closed position and a selected minimum open position.

It is an object of this invention to provide a valve adapted for automatic control which will operate rapidly between closed position and a minimum open position and which will modulate between this minimum position and its wide open position.

It is a further object of the invention to provide a diaphragm actuated valve in which means is provided to cause rapid movement of the valve through a portion of its range of movement while permitting the diaphragm to modulate the valve position throughout the remainder of the range of movement.

Another object is the provision of a diaphragm valve having a diaphragm of two portions, one of which provides modulation of the valve and the other of which causes the valve to operate rapidly.

Another object is to provide a diaphragm valve having a diaphragm of two portions both of which are subject to the same control pressure, but one of which is adapted to modulate the position of the valve as the control pressure varies through a predetermined range, the other of the diaphragm portions being provided with means to cause rapid actuation of the valve at a control pressure outside the aforementioned range of pressures.

Other objects will appear from the specification, the claims and from the drawing in which Figure 1 is a sectionalized view of a valve incorporating various features of my invention, and Figure 2 is a sectionalized view of a modified form of my invention.

Referring to Figure 1 of the drawing, a valve generally indicated at 10 is shown in control of the supply of gas to a heater 11. The heater 11 is provided with a gas burner 12 which is connected to the valve 10 by means of a conduit 13. The valve 10 has an inlet connection 15 through which gas under pressure is supplied to the valve and an outlet connection 17 through which gas is supplied to the conduit 13, both of these connections being formed as a part of a valve body or casing 18. The valve body is of generally cylindrical shape, the cylinder being closed at the top and open at the bottom. The open lower portion of the body 18 is closed by means of a bottom plate 20, the body 18 and the plate 20 being clamped together by means of a plurality of clamping members 22 which hook over the top raised edge of the body 18, and extend through notches formed in the periphery of the plate 20. Clamps 22 are screw threaded and are provided with nuts 23 which may be tightened to draw the valve body 18 and the plate 20 together. A gasket 24 between these two members insures a pressure tight seal.

The inlet connection 15 is suitably threaded internally to receive a conduit, not shown, which supplies gas under pressure to the interior of the valve body 16. A wire-mesh screen 25 of generally cylindrical form is carried on the inside of the valve body 18. The screen 25 is of smaller diameter than the interior diameter of the valve body 18 and provides an annular space surrounding the operating parts to be hereinafter described. The screen 25 performs a dual purpose of defusing the flow of gas as it enters the body 18 and preventing entry of particles which might interfere with the proper operation of the valve.

A valve element 27 cooperates with a valve port and seat 28 formed in the body 18 adjacent the outlet 17 and, in effect, forms a partition separating the space within the body 18 into an inlet chamber 30 and an outlet chamber 31. The valve element 27 comprises a resilient valve disk 33 which cooperates with the seat 28 to form a tight shut-off when the element 27 is in closed position, and a characterized valve skirt 34 which is provided with a V-shaped notch 35 which also cooperates with the inner edge of the valve seat 28 in providing a characterized relationship between the gas flow and valve position. The valve disk 33 and the characterized valve skirt 34 are both attached to a plate 36 by means of a screw 37.

The valve element 27 is positioned with relation to the valve seat 28 by the expansion and contraction of a pair of diaphragms 40 and 41. The upper diaphragm 40 is suitably secured to the plate 36 which forms the lower support for the valve element 27. The lower surface of the diaphragm 40 is suitably secured to a spacing member 43 which in turn is supported by and suitably secured to the upper surface of the lower diaphragm 41. The lower diaphragm 41 is secured in fixed relation to the plate 20 which forms the lower portion of the valve body by means of a post 44 which has its lower portion screw threaded externally to cooperate with suitable screw threads in an opening through the center of plate 20. A lock nut 46 is provided to securely attach the post 44 to the plate 20. The post 44, the member 43, and the diaphragms 40 and 41 are drilled longitudinally to form a passage-way 48 through which the control pressure may be applied to the two diaphragms. The post member 44 is also drilled transversely to form a restricted passage-way 49 communicating with the passage-way 48 and with the inlet chamber 30 within the valve body 18. A wire screen 50 surrounds the post 44 between the plate 20 and the lower diaphragm 41 to prevent the passage of foreign particles through the passage-way 49.

The diaphragm 40 is provided with a spacer 51 which limits the amount of contraction of the diaphragm. A leaf spring 52 acts between the upper surface of the diaphragm and the spacer 51 to exert a force therebetween tending to cause expansion of the diaphragm 40. Likewise a spacer 53 is attached to the lower surface of the diaphragm 41 to limit contraction of that diaphragm. A leaf spring 54 exerts a force between the upper surface of the diaphragm 41 and the spacer 53 tending to expand that diaphragm. The leaf spring 54 is provided with a central opening to allow the passage of gas to or from the diaphragm 40. It will be seen that each of these diaphragms will tend to assume a position or degree of expansion which is proportional to the difference in pressure between that existing in the inlet chamber 30 and the pressure within the diaphragm.

The passageway 48 communicates with a control conduit 56 which terminates in a nozzle 57 of a temperature controller generally indicated at 58 and associated with the heater 11. The controller 58 responds to the temperature of the heater 11 and provides an indication of the demands for fuel supply to the burner 12. The sensitive element of the controller 58 is a rod and tube element 60 which positions a flapper valve 61 with relation to the nozzle 57. Although not shown here, the nozzle 57 and flapper valve 61 are preferably enclosed and the enclosure provided with an exhaust conduit to the combustion chamber of the heater 11. As heretofore mentioned, gas under pressure is supplied to the inlet chamber 30 and a portion of this gas flows through the restriction 49 and into the passageway 48 which communicates with the diaphragms 40 and 41 and also with the nozzle 57. As the flapper valve 61 approaches the nozzle 57 less gas escapes from the nozzle 57 and consequently sufficient gas passes through the restriction 49 to build up the pressure within the diaphragms 40 and 41 and exert a force tending to expand these diaphragms. Likewise, as the flapper valve 61 is moved away from nozzle 57, more gas will escape therefrom and the pressure within the diaphragms will be reduced. Thus, it will be seen that the pressure within the diaphragms is proportional to the temperature within the heater 11 within the range in which the controller 58 is effective, and the pressure within the diaphragms will be indicative of the demands for heat on the heater 11.

It will be seen that the pressure within the diaphragms 40 and 41 is always equal to or less than the pressure within the inlet chamber 30. When the controller 58 indicates that the temperature within the heater 11 is low the flapper valve 61 will open the nozzle 57 and the pressure within the diaphragm 40 will be considerably less than the pressure within the inlet chamber 30 and the diaphragm 40 will collapse against the action of the leaf spring 52 so that the upper surface of this diaphragm lies against the spacer 51. In this case the valve 27 will be moved to wide open position. As the temperature within the heater 11 increases, the pressure within the diaphragm 40 will gradually increase to aid the leaf spring 52 in moving the valve element 27 toward closed position.

The diaphragm 41 is provided with snap action mechanism so that it will not move gradually as the pressure within it increases but will operate rapidly when a predetermined pressure has been reached. A leaf spring 65 is clamped to the plate 20 by the post 44 and is provided with two portions which extend radially and then upwardly around the diaphragm 41. A pair of links 66 are pivoted in the upper ends of the spring 65 and in the member 43 which spaces the diaphragms 40 and 41. The tension on the two ends of the spring 65 may be adjusted by means of a pair of screws 68 which extend through the bottom plate 20. It will be noted that the links 66 extends downwardly between their pivots in the spring 65 and their pivots in the member 43, thus exerting a downward force on the diaphragm 41. The construction of this snap action mechanism is well known and it will be sufficient here to say that the effect of this mechanism is to rapidly reduce the downward force on the diaphragm 41 when upward movement thereof has been initiated so that the diaphragm 41 will move through its range of movement with a snap action. Likewise, when the diaphragm 41 is moving towards collapsed position as shown, when downward motion is initiated the downward force applied by snap action mechanism will be rapidly reduced so the diaphragm 41 will collapse rapidly. The combined effect of the leaf spring 54 within the diaphragm 41 and of the snap action mechanism comprising the spring 65 and the link 66 is that the diaphragm 41 will not act to modulate the position of the valve element 27 but rather to cause it to move in either direction with a snap action. The spring 54 within the diaphragm 41 is selected to be of a strength such that the diaphragm 41 will act to position the member 43, diaphragm 40, and the valve element 27 rapidly to valve closed position after the pressure within the diaphragm 40 has been raised sufficiently to modulate the valve element 27 to a predetermined minimum open position. This predetermined minimum open position is selected so that the valve element 27 will pass sufficient gas to maintain reliable combustion conditions at the burner 12.

Assuming that the flapper valve 61 of the controller 58 is in wide open position and that a relatively low temperature exists within the heater 11, the valve element 27 will be in wide open position. As the temperature within the heater 11 increases, flapper valve 61 will gradually close off the fluid flow through the nozzle 57 and increase the pressure within both of the diaphragms 40 and 41. The diaphragm 41 will remain in the position shown but diaphragm 40 will expand gradually to close off the valve by reducing the area exposed by the characterized valve skirt 34. This action will continue until this valve reaches the predetermined minimum open position, at which time the pressure in the diaphragm 41 will be sufficient to overcome the pressure within the inlet chamber 30 and the effect of the spring 65 and the link 66 acting downwardly thereon. The diaphragm 41 will then act to move the spacer member 43, the diaphragm 40 and valve element 27 upwardly with a rapid motion to close the valve and bring the valve disk 33 against the valve seat 28. Likewise, as the temperature within the heater 11 decreases, the flapper valve 61 will gradually move away from the nozzle 57 to reduce the pressure within the diaphragms 40 and 41. The valve element 27 will remain against the valve seat 28 until the pressure within the diaphragm has been reduced sufficiently so that the pressure within the inlet chamber 30 overcomes the combined effect of the pressure within the diaphragm 41 and the leaf spring 54 to start to collapse the diaphragm 41. Once the diaphragm 41 starts to acting downwardly, the effect of the spring 65 and of the link 66 acting in a downward direction will rapidly increase and the result will be that the diaphragm 41 collapses to the position shown in the drawing. A further reduction of pressure within the diaphragms 40 and 41 will act to modulate the position of the diaphragm 41 towards open position.

It will be understood that under normal conditions the valve will assume a stable position in which just sufficient gas is passed to balance the heat load on the heater 11, and the above described action from wide open to closed positions, and vice versa, would occur very rarely.

Referring now to Figure 2, there is here illustrated a valve which operates in a manner which is very similar to the operation of that shown in Figure 1. A valve body is formed with an upper portion 70 and a lower portion 71 which are suitably secured together by means of a plurality of screws 73. An annular shaped diaphragm 75 is clamped between the upper portion 70 and the lower portion 71 of the valve body and serves to form a pressure tight seal therebetween. The diaphragm 75 extends inwardly of the valve body to form an effective surface which is of generally annular shape. An annular member 77 is suitably secured to the interior edge of the diaphragm 75 and serves in turn as a support for a second diaphragm 78. It will be understood that the diaphragms 75 and 78 are so secured to the member 77 as to form a pressure-tight seal therebetween. When the valve is in open position as illustrated, the diaphragm 75 and member 77 rest against a plurality of lugs 79 formed integrally with the lower portion 71 of the valve body.

The upper portion 70 of the valve body is provided with an inlet connection 80 and an outlet connection 81, the inlet connection 80 being in communication with a suitable source of gas under pressure and the outlet connection 81 being in communication with a gas burner. A valve element 82 is movable with respect to a valve seat 83 formed in the upper portion 70 of the valve body adjacent the outlet 81. The valve element 80 includes a characterized skirt 84 and a resilient disk 85, both of which cooperate with the valve seat 83. Both the characterized valve skirt 84 and the resilient disk 85 are mounted on a plate 86 which is suitably connected to the center of the diaphragm 78. The valve seat 83 effectively forms a partition to separate the upper portion 70 of the valve body into an inlet chamber 88 and an outlet chamber 89. The inlet chamber 88 is in communication with inlet connection 80.

A compression spring 91 acts between a diaphragm 78 and the lower portion 71 of the valve body and tends to move the valve element 82 toward closed position.

A snap action mechanism is provided which acts on the member 77 and hence on the diaphragm 75 to cause it to move rapidly rather than with a gradual action. The snap action mechanism includes a pair of leaf springs 93 which are suitably secured to the upper portion 70 of the valve body as by the rivets 94. A pair of links 96 are pivoted in the outer ends of the leaf springs 93 and in the member 77. This mechanism may be adjusted by means of screws 98 which pass through the upper portion 70 of the valve body and abut the springs 93. It will be seen that the springs 93 and the links 96 are effective to exert a downward force on the member 77 when it is in the position shown.

The lower portion 71 of the valve body is provided with a control connection 100 and a passageway 101 to communicate with the space below the diaphragms 75 and 78. A passageway 103 is provided through the upper portion 70 and the lower portion 71 of the valve body and also through the diaphragm 75 to a restriction 104 to the space below the diaphragm. The restriction 104 provides a limited flow of gas to this space, and also to the controller which is connected to the valve at 100. The action of the controller is the same as that described in connection with Figure 1 and modulates the pressure beneath the diaphragms 75 and 78 to increase that pressure when the temperature of the heater being controlled is increased and to decrease the control pressure as the temperature of the heater decreases.

When the heater is relatively cold, the various parts of the valve will be in substantially the position shown. As the temperature starts to increase, the pressure beneath the diaphragms 75 and 78 will gradually increase, the diaphragm 75 being held in the position shown by the springs 93 and the links 96 but the diaphragm 78 will be gradually raised. The diaphragm 78 and hence the valve element 82 will assume a position such that the pressure in the inlet chamber 88 equals the combined effect of the control pressure and the force exerted by the spring 91. As the diaphragm 78 moves upwardly, it will gradually assume a conical shape and will eventually reach a position in which it can no longer further expand. Therefore, as the control pressure beneath the diaphragm 78 further increases, the diaphragm 78 will tend to raise the member 77 and the diaphragm 75. When the upward force on the diaphragm 75 is sufficient to overcome the combined effect of the pressure in the inlet chamber 88 and the effect of the snap action mechanism including the springs 93 and the links 96 the diaphragm 75 together with the member 77 and the diaphragm 78 will move upwardly with a rapid motion to close the valve element 82 against the valve seat 83. The diaphragm 78 is so constructed that when it has reached its limit of upward flexibility the valve element 82 will be in a predetermined minimum open position which will pass sufficient gas to maintain reliable combustion at the burner being supplied with gas.

Likewise, as the temperature at the heater being controlled decreases, the control pressure beneath the diaphragms 75 and 78 will be gradually decreased until a pressure is reached where the pressure in the inlet chamber 88 overcomes the effect of the spring 91 and the control pressure. Once the member 77 starts to move downwardly, the snap action mechanism including the springs 93 and the links 96 will exert a rapidly increasing downward force on the member 77 and the valve element 82 will be moved rapidly to its predetermined minimum open position at which position the diaphragm 78 is in its upward limit of movement with respect to the member 77 and the member 77 has moved downwardly against the lugs 79 provided on the lower portion 71 of the valve casing.

It is not essential that the link 96 be moved over-center when the member 77 is moved upwardly, and in this case it is preferable that the link 96 always exert a downward force on the member 77. The only requirement here is that the links 96 moves through a sufficient angle so that the force they exert downwardly on the member 77 changes sufficiently to produce a snap action.

It will be seen that I have provided a valve adapted to the control of the supply of a fluid fuel to a burner which provides modulating action through part of the range of movement of the valve but which provides rapid movement of the valve between closed position and a predetermined minimum open position. The valve may assume a great many forms as will be apparent to one skilled in the art but I have chosen to show two embodiments of the invention, which are illustrative. I am to be limited therefore only by the scope of the appended claims.

I claim as my invention:

1. In a valve for varying the flow of fluid through a conduit, in combination, a valve element movable through a predetermined distance and adapted to cooperate with a member in determining the effective valve opening, diaphragm means operatively connected to said valve element, means for using the fluid entering the valve to form a pressure differential condition between the interior and exterior of the diaphragm means, said diaphragm means including first and second flexible portions adapted to deform for positioning said valve element in accordance with the pressure differential on the two sides of said diaphragm means, and means for causing one of the portions of said diaphragm means to move with a quick action in one direction through a predetermined range of movement when said pressure differential exceeds a predetermined value and to move with a quick action in the opposite direction through substantially the same range of movement when the pressure differential drops below a predetermined value.

2. In a valve for varying the flow of fluid through a conduit, in combination, a valve element movable through a predetermined distance and adapted to cooperate with a member in determining the effective valve opening, diaphragm means operatively connected to said valve element, means for using the fluid entering the valve to form a pressure differential condition between the interior and exterior of the diaphragm means, said diaphragm means including first and second flexible portions adapted to deform for positioning said valve element in accordance with the pressure differential on the two sides of said diaphragm means, and means acting on said second portion for causing said diaphragm means to move with a quick action in one direction through a predetermined range of movement when said pressure differential exceeds a predetermined value and to move with a quick action in the opposite direction through substantially the same range of movement when the pressure differential drops below a predetermined value.

3. In a valve in combination, a movable valve element adapted to cooperate with a member in determining the effective valve opening, first and second pressure responsive means operatively connected to said valve element, means for using the fluid entering the valve to form a pressure differential condition between the interior and exterior of the pressure responsive means, said first pressure responsive means acting to position said valve element at a point within a predetermined range of movement which is a function of the pressure differential on the two sides of said first pressure responsive means, and means to cause said second pressure responsive means to move said valve element rapidly in one direction through a range of movement when the pressure differential on the two sides of said second pressure responsive means reaches a predetermined value and to move said valve element rapidly in the opposite direction when the pressure differential drops slightly below said predetermined value.

4. In a valve, in combination, a valve body, means forming a partition in said body dividing it into inlet and outlet chambers, a valve element movable with respect to said partition and cooperating with an opening therethrough in determining the effective valve opening, a first pressure responsive diaphragm operatively connected to said valve element and adapted to position said element with respect to said partition, said diaphragm being subjected on one side to the pressure of said inlet chamber and on the other side to a variable control pressure whereby said valve element is caused to assume a position with respect to said partition which is a function of the control pressure, a second pressure responsive diaphragm operatively connected to said first diaphragm, said second diaphragm being subjected on one side to inlet pressure and on the opposite side to control pressure, and means associated with said second diaphragm for causing it to move said first diaphragm rapidly at a predetermined pressure differential, whereby said valve element is moved rapidly through a portion of its range of movement.

5. In a valve, in combination, a valve body, a valve element movable through a predetermined distance and adapted to cooperate with a member in said valve body in determining the effective valve opening, a first diaphragm mounted on said valve body, a second diaphragm mounted on said first diaphragm and movable thereby, said second diaphragm being expansible through a predetermined range with respect to said first diaphragm, means operatively connecting said valve element and said second diaphragm, whereby the expansions of said two diaphragms add in determining valve position, both of said diaphragms being subjected to a control fluid under variable pressure, first resilient means acting on said first and second diaphragms in one direction and first tending to deform said second diaphragm until it has moved to one limit of its range of expansion, and then tending to move said first diaphragm, and second resilient means for causing said second diaphragm to be moved rapidly by said first diaphragm.

6. In a valve for varying the flow of fluid through a conduit, in combination, a valve element movable through a predetermined range and adapted to cooperate with a member in determining the effective valve opening, diaphragm means operatively connected to said valve element, said diaphragm means comprising two portions both of which are adapted to be subject to the same effective control pressure, first resilient means for causing one portion of said diaphragm means to modulate the position of said valve element with respect to said member as the control pressure varies through a predetermined range, and second resilient means for causing the other portion of said diaphragm means to move said valve element rapidly on variation of the control pressure outside of the predetermined range.

7. In a valve for varying the flow of fluid through a conduit, in combination, a valve element movable through a predetermined range and adapted to cooperate with a member in determining the effective valve opening, diaphragm means operatively connected to said valve element, said diaphragm means comprising two portions both of which are adapted to be subject to the same effective control pressure, first resilient means for causing one portion of said diaphragm means to modulate the position of said valve element with respect to said member as the control pressure varies through a predetermined range, and resilient snap acting linkage mechanism for causing the other portion of said diaphragm means to move said valve element rapidly on variation of the control pressure outside of the predetermined range.

8. In a valve, in combination, a valve body, means forming a partition in said body dividing it into inlet and outlet chambers, a valve element movable with respect to said partition and cooperating with an opening therethrough in determining the effective valve opening, a first pressure responsive diaphragm operatively connected to said valve element and adapted to position said element with respect to said partition, said diaphragm being subjected on one side to a variable control pressure whereby said valve element is caused to assume a position with respect to said partition which is a function of the control pressure, a second pressure responsive diaphragm operatively connected to said first diaphragm, said second diaphragm being subject on one side to said control pressure, and means associated with said second diaphragm for causing it to move said first diaphragm rapidly at a predetermined pressure differential, whereby said valve element is moved rapidly through a portion of its range of movement.

9. In a control mechanism, a control element movable through a predetermined range and adapted to cooperate with a member in determining a controlling effect, a first pressure responsive diaphragm operatively connected to said control element and adapted to position said element with respect to said partition, said diaphragm being subjected on one side to a variable control pressure whereby said control element is caused to assume a position with respect to said member which is a function of the control pressure, a second pressure responsive diaphragm operatively connected to said first diaphragm, said second diaphragm being subject on one side to said control pressure, and means associated with said second diaphragm for causing it to move said first diaphragm rapidly at a predetermined pressure differential, whereby said control element is moved rapidly through a portion of its range of movement.

10. In a valve for varying the flow of fluid through a conduit, in combination, a valve element movable through a predetermined range and adapted to cooperate with a member in determining the effective valve opening, a first diaphragm operatively connected to said valve element for positioning said element at a point which is a function of the difference in pressure on the two sides of said diaphragm, an annular ring to which said first diaphragm is secured, a second diaphragm secured to said annular ring and said annular ring and second diaphragm supporting said first diaphragm, said second diaphragm being subjected to the same pressure differential as said first diaphragm, and means associated with said second diaphragm for causing it to move said annular ring and said first diaphragm rapidly at a predetermined pressure differential, whereby said valve element is moved rapidly through a portion of its range of movement.

11. In a valve for varying the flow of fluid through a conduit, in combination, a valve element movable through a predetermined range and adapted to cooperate with a member in determining the effective valve opening, a first diaphragm operatively connected adjacent its center to said valve element for positioning said element at a point which is a function of the difference in pressure on the two sides of said diaphragm, an annular ring to which the outer edge of said first diaphragm is secured, a second diaphragm secured to and supporting said annular ring and said first diaphragm, said second diaphragm being subjected to the same pressure differential as said first diaphragm, and means associated with said second diaphragm for causing it to move said annular ring and said first diaphragm rapidly at a predetermined pressure differential, whereby said valve element is moved rapidly through a portion of its range of movement.

CHARLES B. SPANGENBERG.